(12) United States Patent
Lin et al.

(10) Patent No.: US 8,462,880 B2
(45) Date of Patent: Jun. 11, 2013

(54) SYSTEM AND METHOD FOR TRANSMITTER ELECTROMAGNETIC INTERFERENCE (EMI) REDUCTION

(75) Inventors: Sheng Lin, Sunnyvale, CA (US); Menping Chang, Cupertino, CA (US)

(73) Assignee: MICREL, Inc., San Jose, CA (US)

( * ) Notice: Subject to any disclaimer, the term of this patent is extended or adjusted under 35 U.S.C. 154(b) by 860 days.

(21) Appl. No.: 12/548,229

(22) Filed: Aug. 26, 2009

(65) Prior Publication Data
US 2011/0051819 A1  Mar. 3, 2011

(51) Int. Cl.
  *H04K 1/02* (2006.01)
  *H04L 25/03* (2006.01)
  *H04L 25/49* (2006.01)

(52) U.S. Cl.
  USPC ............ 375/296; 375/257; 375/295; 375/309

(58) Field of Classification Search
  USPC ................. 375/295–296, 242, 244, 257–258, 375/309
  See application file for complete search history.

(56) References Cited

U.S. PATENT DOCUMENTS

| | | | | |
|---|---|---|---|---|
| 6,741,644 | B1* | 5/2004 | Dehghan et al. | 375/229 |
| 6,980,644 | B1* | 12/2005 | Sallaway et al. | 379/391 |
| 2001/0038674 | A1* | 11/2001 | Trans | 375/355 |
| 2004/0096004 | A1* | 5/2004 | Wang | 375/257 |
| 2004/0105504 | A1* | 6/2004 | Chan | 375/257 |

* cited by examiner

*Primary Examiner* — Chieh M Fan
*Assistant Examiner* — James M Perez
(74) *Attorney, Agent, or Firm* — Weiss & Moy, P.C.; Jeffrey D. Moy

(57) ABSTRACT

A device for Electro-Magnetic Interference (EMI) reduction in an Ethernet system has an Ethernet compatible device. The Ethernet compatible device has a filter for adjusting a signal outputted by the Ethernet compatible device for EMI reduction.

12 Claims, 5 Drawing Sheets

SYSTEM AND METHOD FOR TRANSMITTER ELECTROMAGNETIC INTERFERENCE (EMI) REDUCTION

FIELD OF THE INVENTION

This invention relates to network systems and, more specifically, to a device and method for reducing EMI issues while retaining compatibility with existing Ethernet based systems.

BACKGROUND OF THE INVENTION

Ethernet was originally based on the idea of computers communicating over a shared coaxial cable acting as a broadcast transmission medium. Ethernet has evolved into a complex networking technology that today underlies most LANs. The coaxial cable was replaced with point-to-point links connected by Ethernet hubs and or switches. This enabled one to reduce installation costs, increase reliability, and enable point-to-point management and troubleshooting. Ethernet has evolved to become the main network of choice for data communication.

Ethernet may be connected to devices through Category 5 (CAT5) cables. CAT5 cables comprise a twisted pair of high signal integrity cable housed within a single cable jacket. This use of balanced lines helps preserve a high signal-to-noise ratio despite interference from both external sources and other pairs (i.e., crosstalk).

Ethernet is capable to connect to devices through CAT5 cable with a span of approximately 100 meters with data rates running at 10, 100 or 1000 M-bit per second. For better margins, it is common that most devices may reach 130 meters or above. Further, the use of switches allows devices to run at full duplex mode without worrying about the collision domain which limits the total cable length and its delay of the network.

Presently, efforts are being made to expand Ethernet uses to EMI sensitive areas. These may include, but are not limited to areas such as the medical and automotive fields. However, the nature of transmit coding schemes has dictated the EMI performance. Changing the coding schemes may greatly relieve the EMI issue. However, changing the coding scheme will make it incompatible with existing devices.

Therefore, a need existed to provide a system and method to overcome the above problems. The system and method would reduce EMI issues while remaining compatible with existing Ethernet systems and devices.

SUMMARY OF THE INVENTION

A device for Electro-Magnetic Interference (EMI) reduction in an Ethernet system has an Ethernet compatible device. The Ethernet compatible device has a filter for adjusting the signal output transmitted by the Ethernet compatible device for EMI reduction.

A data transmission system has a first Ethernet compatible device and a second Ethernet compatible device (referred as link partner). A cable couples the first Ethernet device to and the second Ethernet device (link partner). A filter is coupled to the first Ethernet compatible device for adjusting attenuation of a signal outputted by the first Ethernet compatible device for EMI reduction in the data transmission system.

The present invention is best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 1:
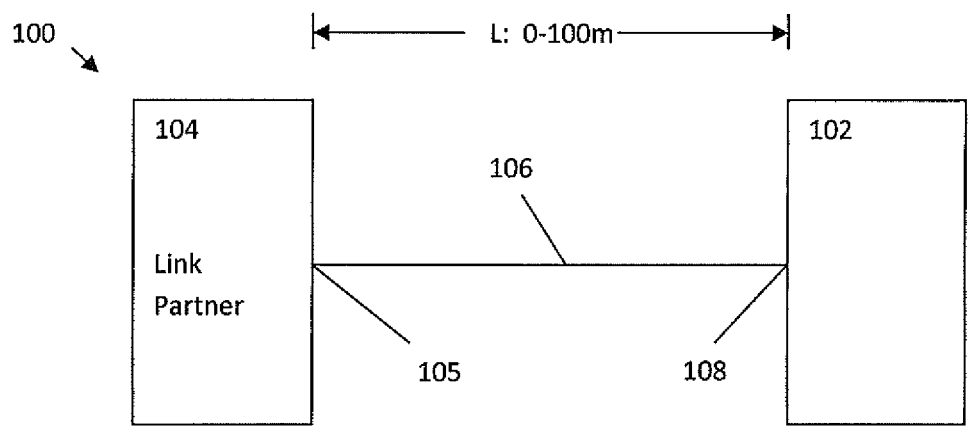
FIG. 1 is a simplified functional block diagram of an existing Ethernet system.

Referring to FIG. 1, an existing Ethernet based system 100 is shown. The system 100 may include a first device 102. The first device 102 may be connected to a second device 104 (hereinafter link partner 104). The first device 102 may be connected to the link partner 104 via a cable 106. In general, the cable 106 may be a CAT5 cable, a CAT5e cable, CAT6, or the like. The listing of the above is given as an example and should not be seen in a limiting manner. Presently, in Ethernet networks, it is generally recommended that the cable 106 runs be limited to a maximum length of approximately 100 m. While passing signals, the cable 106 acts as an attenuator. Thus, as the length of the cable 106 increases, the distortion of the signal traveling through the cable 106 at node 105 also increases. The distortion may be a reduction of amplitude (loss) and phase shift (delay) of the signal traveling through the cable 106. It has been found that the loss is frequency dependent, broadly rising with frequency, although the actual level of loss is not linearly dependent upon the frequency.

Figure 2:
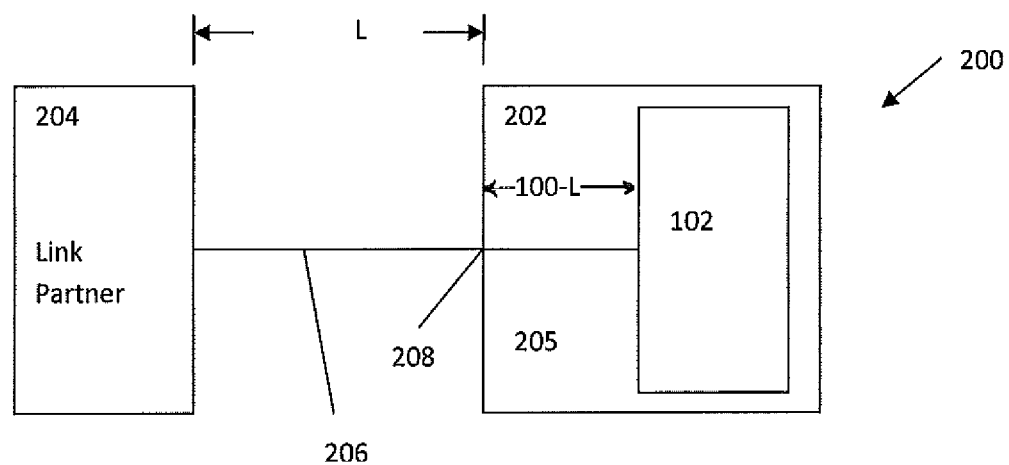
FIG. 2 is a simplified functional block diagram of one embodiment of an Ethernet system of the present invention.

Referring now to FIG. 2, an Ethernet based system 200 in accordance with one embodiment is shown. The system 200 may include a first device 202. The first device 202 may be connected to a second device 204 (hereinafter link partner 204). The second device 204 may be the same as the link partner 104 shown in FIG. 1. The first device 202 may be connected to the link partner 204 via cables 206 (external) and 205 (internal). In general, the first device 202 and the link partner 204 may be Ethernet compatible devices These may include but are not limited to network devices such as routers, switches, personal computer, computer peripherals, or the like. The cables 205 and 206 may be a CAT5 cable, a CAT5e cable, CAT6, or the like. The listing of the above is given as an example and should not be seen in a limiting scope. Cable 206, length L, is similar to cable 106. Cable 205 is an extra piece of internal cable with its length (100-L), so that the total length is approximately 100 meter between device 102 and its link partner 204.

The extra cable 205 acts as a low pass filter with amplitude reduction and phase delay which may be used to reduce EMI issues at node 208 in the system 200. The amplitude reduction has a direct one to one effect on EMI reduction. The phase delay which slows down the rate of transition edge has even stronger effect in reducing the EMI. Thus, by properly filtering the signal transmitted by the first device 202 and incorporating a portion of the internal cable attenuation 205 in the signal, the system 200 will allow the first device 202 and link partner 204 to communicate within the specification allowed cable length (i.e., 100 meter), with EMI reduced and fully compatible with existing Ethernet systems.

In the present embodiment, the first device 202 is an Ethernet compatible device which capable of transmitting a signal to the link partner 204. However, it should be noted that the first device 202 may further be able to receive signals as well as transmit signals. The first device 202 incorporates a programmable portion of the internal cable 205 as part of the first device 202. In the embodiment shown, corresponding to the external cable length L meters of 206, (100-L) meters of the internal cable 205 is incorporated as part of the first device 202. As a result, in system 200, the total reach of the cable (206+205) is always approximately 100 meters, maximum allowed by the specification. The EMI performance of node 208 in the system 200 is improved by cable 205 attenuation compared with node 108 in the system 100. Where shorter length of cable 106 and 206 may be used, the system 200 provides better EMI performance than that of system 100 due to the effect of extra cable 205.

Figure 3:
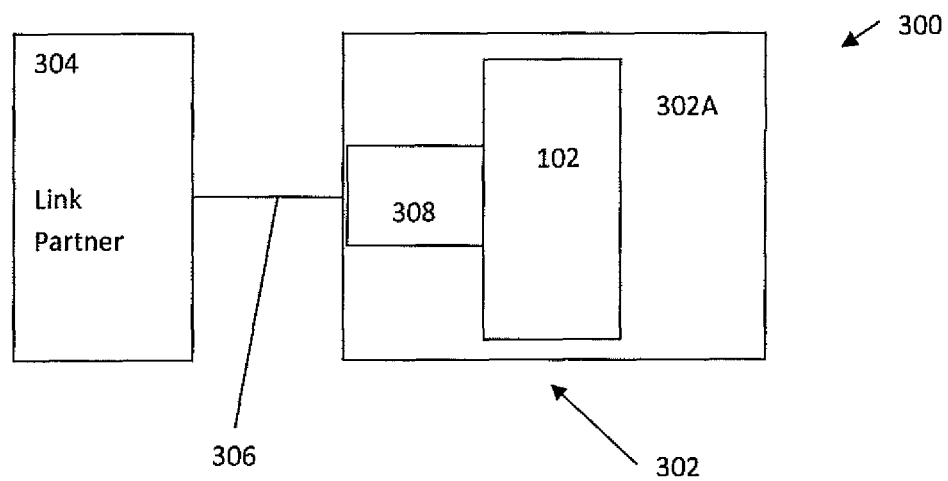
FIG. 3 is a simplified functional block diagram of another embodiment of an Ethernet system of the present invention.

Referring now to FIG. 3, an Ethernet based system 300 in accordance with another embodiment is shown. The system 300 may include a first device 302. The first device 302 may be connected to a second device 304 (hereinafter link partner 304). The second device 304 may be the same as the link partner 104 shown in FIG. 1. The first device 302 may be connected to the link partner 304 via a cable 306. In general, the first device 302 and the link partner 304 may be Ethernet compatible devices. These may include but are not limited to network devices such as routers, switches, personal computers, computer peripherals, or the like. The cable 306 may be a CAT5 cable, a CAT5e cable, CAT6, or the like. The listing of the above is given as an example and should not be seen in a limiting scope.

In FIG. 2, the internal cable 205 acts as a low pass filter with amplitude reduction and phase delay which may be used to reduce EMI. In FIG. 3, the cable 205 is replaced by a filter 308 which has the similar characteristic of cable 205 in terms of phase delay and amplitude reduction.

In the present embodiment, the first device 302 is an Ethernet compatible transmitting device 302A. However, it should be noted that the first device 302 may further be able to receive signals as well as transmit signals. The transmitting device 302A incorporates a filter 308 as part of the transmitting device 302A. The filter 308 may be a programmable filter. The programmable filter 308 may store the cable characteristic into its register to allow the programmable filter 308 to generate a signal having a frequency response similar to the characteristics of the cable 205 (FIG. 2) at any given length. Thus, attenuation and filtering can be a programmable feature based on the length of the cable required. The programmable filter 308 will allow the first device 302 to transmit a waveform similar to the waveform normally transmitted by the first device 102 of FIG. 1 with the output attenuated by the length of the cable 205 of FIG. 2. No modifications are needed for link partner device 304. Thus, the first device 302 and link partner 304 are able to communicate with a reasonable cable length, with EMI reduced and fully compatible with existing Ethernet systems.

Figure 3A:
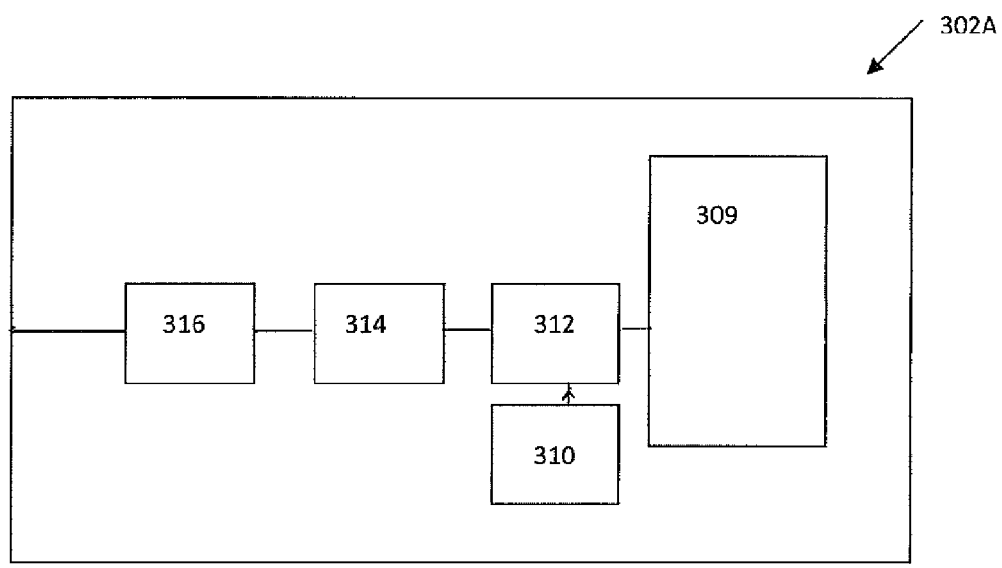
FIG. 3A is a simplified functional block diagram of an Ethernet device of FIG. 3.

The first device 302 may take on many different forms based on the type of Ethernet device the first device 302 takes. As in FIG. 3, conceptually device 302 is a combination of device 102 and a filter 308 which has a programmable cable characteristic. Referring to FIG. 3A, in the present embodiment the device 302 is an Ethernet compatible device 302A. The device 302A may take on many different forms. In accordance with one embodiment, the device 302A is comprised of a device 309 to handle both receive (receiving path not shown) and transmit data, registers 310 to store the cable characteristic at various length, a digital processing unit 312 to carry out the filter operation in digital domain, a DAC 314 to convert digital signal into analog form, and a driver device 316 to drive the cable signal. The device 302A may have other functional blocks without departing from the spirit and scope of the present invention.

The programmable feature of 302A will allow the first device 302 to deliver a waveform similar to the waveform normally received by the link partner at node 105 in the system 100 of FIG. 1, through cable 106 with a length of 100 meter. The output is first filtered by 308 which has the equivalent length (100-L) of the cable 205. Then signal passes through cable 306 which has the length of L. Thus, transmitter attenuation and filtering can be a programmable feature based on the length L of the cable run. This allows the first device 302 and link partner device 304 to communicate within a reasonable cable length (100 meter), with EMI reduced and fully compatible with existing Ethernet systems. It is worthwhile to point out that if the cable length is already equal to 100 meter, there will be nothing left to attenuate and therefore the EMI reduction is limited. However, in many applications, such as automotive applications, the cable length required is very short and EMI reduction potential is great.

Figure 4:
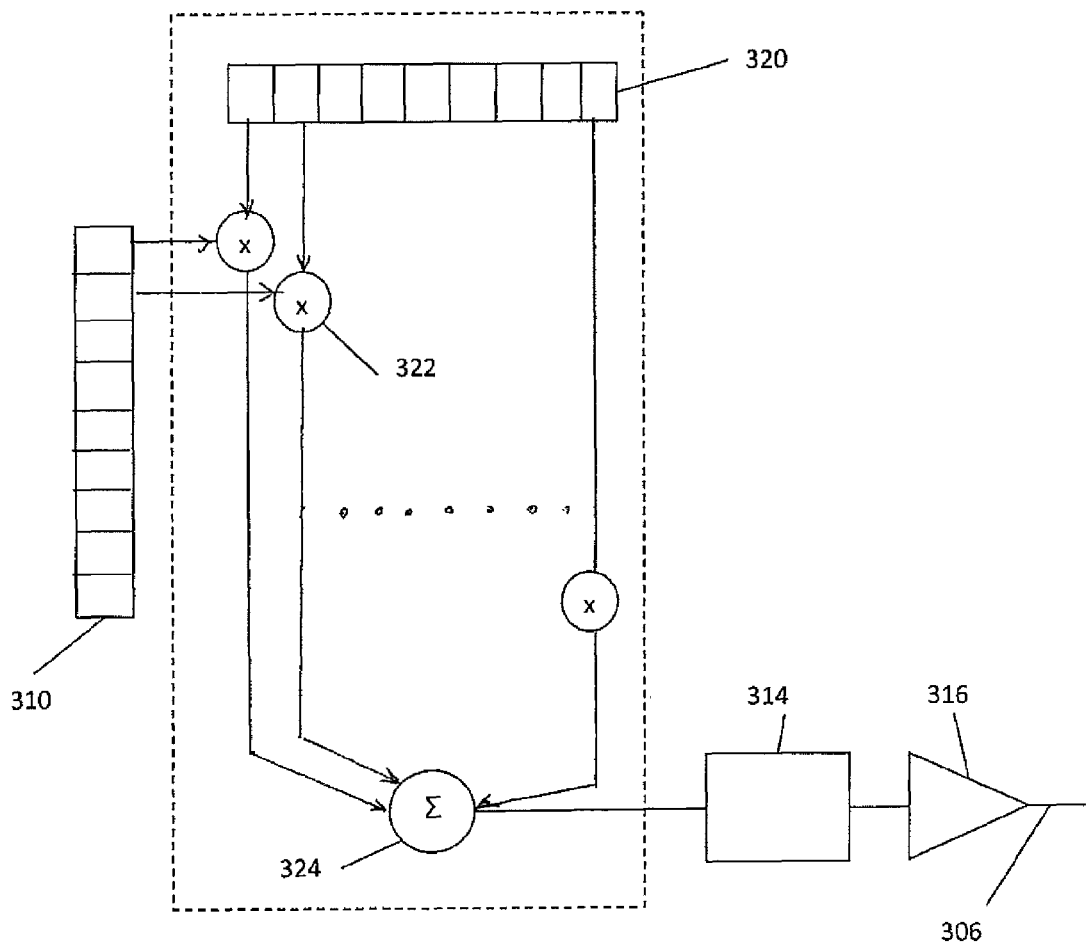
FIG. 4 is a simplified functional block diagram of a filter device used in the Ethernet system of FIG. 3.

Referring to FIG. 4, one embodiment of the digital processor programmable filter 312 is shown. In this embodiment, the digital processor programmable filter 312 will have a shift register 320, a plurality of multipliers 322 depending on the bit resolution required, and an adder 324 to sum the digital signals. The filtered output then connects to the DAC 314, changing signals to analog waveform and delivers to the cable by the Driver 316.

The digital processor programmable filter 312 is capable to adjust its filter performance to match the cable characteristic at various lengths. Based on the actual cable length used between the two link partners, the digital processor programmable filter 312 response can be chosen such that it delivers the least EMI intrusive yet allowed output, and on the receiving end of the link partner it resembles a signal attenuated after 100 meter of cable. This delivers the most optimize EMI performance. That is, it turns the unused receiver capability for the EMI performance enhancement by filtering/attenuating the transmitter signal.

In accordance with one embodiment, the digital processor programmable filter 312 has its characteristic (amplitude and phase response) closely resemble a CAT5 cable. Furthermore, the digital processor programmable filter 312 is programmable to match the amplitude and frequency response of the CAT5 cable at various cable lengths. The maximum cable reach of Ethernet point to point connection is 100 meter. For any connection that does not require the distance of 100 meter, it is feasible to activate such a filter to reduce the transmitter output according to the unused cable distance and therefore reduce the EMI.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A device for Electro-Magnetic Interference (EMI) reduction in an Ethernet system comprising:
   an Ethernet compatible device;
   a cable of length L coupled to the Ethernet compatible device, wherein the cable length L is greater than 0 meters but less than 100 meters in length; and a programmable filter coupled between the Ethernet compatible device and the cable for adjusting transmit signal amplitude and phase by the Ethernet compatible device for EMI reduction, wherein the programmable filter is selected to have an amplitude and frequency response having characteristics of a Cat 5 cable of length equal to 100-L meters for said EMI reduction.

2. A device for Electro-Magnetic Interference (EMI) reduction in accordance with claim 1 wherein the programmable filter comprises:
 a storage registry; and
 an adder which combines an output signal from the storage registry with a signal from the Ethernet compatible device.

3. A device for Electro-Magnetic Interference (EMI) reduction in accordance with claim 1 wherein the transmitter device comprises:
 a device to transmit data coupled to the programmable filter;
 a DAC coupled to an output of the device to transmit data to convert a digital signal into analog form; and
 a driver coupled to an output of the DAC.

4. A device for Electro-Magnetic Interference (EMI) reduction in an Ethernet system comprising:
 an Ethernet compatible device coupled to a cable of length L, wherein the cable length L is greater than 0 meters but less than 100 meters in length; and
 a filter coupled to the Ethernet compatible device for adjusting the amplitude and phase of an output signal of the Ethernet compatible device for EMI reduction in the Ethernet system, wherein the filter is a programmable filter selected to have an amplitude and frequency response having characteristics of a Cat 5 cable of length 100-L meters for said EMI reduction.

5. A device for Electro-Magnetic Interference (EMI) reduction in accordance with claim 4 wherein the programmable filter comprises:
 a shift registry for storing data of the Ethernet compatible device;
 a plurality of multipliers coupled to the shift registry and to a storage registry for combining data from the shift registry and the storage registry; and
 an adder which combines the output data of the plurality of multipliers.

6. A device for Electro-Magnetic Interference (EMI) reduction in accordance with claim 5 wherein the storage registry contains data of Cat 5 cable attenuation.

7. A device for Electro-Magnetic Interference (EMI) reduction in accordance with claim 4 wherein the Ethernet compatible device is a transmitter device.

8. A device for Electro-Magnetic Interference (EMI) reduction in accordance with claim 7 wherein the transmitter device comprises:
 a device to transmit data coupled to the programmable filter;
 a DAC coupled to an output of the device to transmit data to convert a digital signal into analog form; and
 a driver coupled to an output of the DAC.

9. A data transmission system comprising:
 a first Ethernet compatible device;
 a second Ethernet compatible device;
 a cable coupled to the first Ethernet device and the second Ethernet device, the cable having a length L, wherein the cable length L is greater than 0 meters but less than 100 meters in length; and
 a filter coupled to the first Ethernet compatible device for adjusting amplitude and phase of a signal outputted by the first Ethernet compatible device for EMI reduction in the data transmission system, wherein the filter is a programmable filter selected to have an amplitude and frequency response having characteristics of a Cat 5 cable of length 100-L meters for said EMI reduction.

10. A device for Electro-Magnetic Interference (EMI) reduction in accordance with claim 9 wherein the programmable filter comprises:
 a shift registry for storing data of the Ethernet compatible device;
 a plurality of multipliers coupled to the shift registry and to a storage registry for combining data from the shift registry and the storage registry; and
 an adder which combines the output data of the plurality of multipliers.

11. A device for Electro-Magnetic Interference (EMI) reduction in accordance with claim 10 wherein the storage registry contains data of Cat 5 cable attenuation.

12. A device for Electro-Magnetic Interference (EMI) reduction in accordance with claim 9 wherein the first Ethernet compatible device is a transmitter device comprising:
 a device to transmit data coupled to the programmable filter;
 a DAC coupled to an output of the device to transmit data to convert a digital signal into analog form; and
 a driver coupled to an output of the DAC.

* * * * *